United States Patent
Lu et al.

(10) Patent No.: US 11,721,079 B2
(45) Date of Patent: Aug. 8, 2023

(54) DISPLAY METHOD BASED ON AUGMENTED REALITY, DEVICE, STORAGE MEDIUM AND PROGRAM PRODUCT

(71) Applicant: Beijing Zitiao Network Technology Co., Ltd., Beijing (CN)

(72) Inventors: Zhixiong Lu, Beijing (CN); Zihao Chen, Los Angeles, CA (US)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/695,582

(22) Filed: Mar. 15, 2022

(65) Prior Publication Data
US 2022/0254116 A1    Aug. 11, 2022

Related U.S. Application Data

(63) Continuation of application No. PCT/CN2022/073593, filed on Jan. 24, 2022.

(30) Foreign Application Priority Data

Feb. 9, 2021 (CN) .......................... 202110182060.X (51) Int. Cl.
 *G06T 19/00*  (2011.01)
 *G06T 7/10*  (2017.01)
 *G06T 13/00*  (2011.01)

(52) U.S. Cl.
 CPC .............. *G06T 19/006* (2013.01); *G06T 7/10* (2017.01); *G06T 13/00* (2013.01); *G06T 2207/20092* (2013.01); *G06T 2207/30201* (2013.01)

(58) Field of Classification Search
 CPC .......... G06T 19/006; G06T 7/10; G06T 13/00
 See application file for complete search history.

(56) References Cited

U.S. PATENT DOCUMENTS

| 2005/0046629 | A1* | 3/2005 | Jeong ...................... G06T 13/20 |
| | | | 345/473 |
| 2005/0075557 | A1* | 4/2005 | Kamiyama ............. A63F 13/10 |
| | | | 600/407 |

(Continued)

FOREIGN PATENT DOCUMENTS

| CN | 107203263 A | 9/2017 |
| CN | 107526443 A | 12/2017 |

(Continued)

OTHER PUBLICATIONS

Written Opinion for International Patent Application No. PCT/CN2022/073593, dated Mar. 18, 2022 (11 pages).

(Continued)

*Primary Examiner* — Yi Yang
(74) *Attorney, Agent, or Firm* — Arentfox Schiff LLP (57) ABSTRACT

Embodiments of the present disclosure provide a display method based on augmented reality, a device, a storage medium, and a program product, a real-time scene image is acquired, then a head image of a target object is acquired from the real-time scene image if the real-time scene image includes a face image of the target object, where the head image of the target object includes the face image of the target object; a virtual image of the target object is generated according to the head image; and the virtual image of the target object is displayed in the real-time scene image based on an augmented reality display technology.

19 Claims, 5 Drawing Sheets

(56) References Cited

U.S. PATENT DOCUMENTS

| | | | | |
|---|---|---|---|---|
| 2017/0032577 | A1* | 2/2017 | Smith | G06V 40/103 |
| 2019/0286884 | A1* | 9/2019 | Rhee | G06T 15/04 |
| 2020/0090393 | A1* | 3/2020 | Shin | G06V 40/174 |
| 2020/0234034 | A1 | 7/2020 | Savchenkov et al. | |
| 2020/0357180 | A1* | 11/2020 | Knight | H04N 7/18 |

FOREIGN PATENT DOCUMENTS

| | | |
|---|---|---|
| CN | 108255304 A | 7/2018 |
| CN | 108536277 A | 9/2018 |
| CN | 108614638 A | 10/2018 |
| CN | 108629339 A | 10/2018 |
| CN | 109949207 A | 6/2019 |
| CN | 110211222 A | 9/2019 |
| CN | 111694431 A | 9/2020 |
| CN | 112053449 A | 12/2020 |
| CN | 112162628 A | 1/2021 |
| CN | 112884908 A | 6/2021 |
| CN | 113858158 A | 12/2021 |
| KR | 20120118655 A | 10/2012 |
| KR | 20170018930 A | 2/2017 |
| KR | 20190006553 A | 1/2019 |
| WO | 2020150689 A1 | 7/2020 |

OTHER PUBLICATIONS

First Office Action for Chinese Patent Application No. 202110182060. X, dated Feb. 11, 2022 (16 pages).

Tang, "Non-Patent document VR interactive graphics and image hybrid modeling based on synesthesia effect", p. 105, Jun. 2020 (2 pages).

Office Action in KR1020227018309, dated Jan. 25, 2023, 10 pages.

Extended European Search Report for European Patent Application No. 22724620.4, dated Jun. 7, 2023 (7 pages).

* cited by examiner

DISPLAY METHOD BASED ON AUGMENTED REALITY, DEVICE, STORAGE MEDIUM AND PROGRAM PRODUCT

CROSS-REFERENCE TO RELATED APPLICATIONS

This application is a continuation of International Application No. PCT/CN2022/073593, filed on Jan. 24, 2022, and entitled "DISPLAY METHOD BASED ON AUGMENTED REALITY, DEVICE, STORAGE MEDIUM AND PROGRAM PRODUCT", which claims priority to the Chinese Patent Application No. 202110182060.X, filed on Feb. 9, 2021, and entitled "DISPLAY METHOD BASED ON AUGMENTED REALITY, DEVICE, STORAGE MEDIUM AND PROGRAM PRODUCT". The contents of the above applications are hereby incorporated by reference in their entireties in this application.

TECHNICAL FIELD

Embodiments of the present disclosure relate to the field of computer and network communication technology, and in particular, to a display method based on augmented reality, a device, a storage medium and a program product.

BACKGROUND

Augmented reality technology (AR), a technology that integrates virtual information with the real world, widely uses multimedia, three-dimensional modeling, real-time tracking and registration, intelligent interaction, sensing and other technical means to apply simulations of computer-generated texts, images, three-dimensional models, music, video and other virtual information to the real world, and the two kinds of information complement each other, thus realizing an "enhancement" of the real world. With the development of the augmented reality technology, it has been widely used in various industries.

One application of the AR technology in the prior art is to superimpose a virtual model in the real world, such as a cartoon character model, an animal model, etc. However, the virtual model in the prior art is usually fixed and is pre-designed by a developer, which renders an image of the virtual model relatively single and cannot meet diverse needs of users, which in turn affects the user's willingness and experience to use the AR technology.

SUMMARY

Embodiments of the present disclosure provide a display method based on augmented reality, a device, a storage medium and a program product, and the display method based on augmented reality, device, and storage medium are used to overcome the problem that the image of the virtual model is relatively single and cannot meet the diverse needs of users.

In a first aspect, an embodiment of the present disclosure provides a display method based on augmented reality, including:

acquiring a real-time scene image;

if the real-time scene image includes a face image of a target object, then acquiring a head image of the target object from the real-time scene image, where the head image of the target object includes the face image of the target object;

generating a virtual image of the target object according to the head image;

displaying the virtual image of the target object in the real-time scene image based on an augmented reality display technology.

In a second aspect, an embodiment of the present disclosure provides a display device based on augmented reality, including:

an acquiring unit, configured to acquire a real-time scene image;

an image segmenting unit, configured to, in a condition that the real-time scene image includes a face image of a target object, then acquire a head image of the target object from the real-time scene image, where the head image of the target object includes the face image of the target object;

a generating unit, configured to generate a virtual image of the target object according to the head image;

a displaying unit, configured to display the virtual image of the target object in the real-time scene image based on an augmented reality display technology.

In a third aspect, an embodiment of the present disclosure provides an electronic device, including: at least one processor and a memory;

the memory stores a computer-executable instruction; and the at least one processor executes the computer-executable instruction stored in the memory, to enable the at least one processor to execute the display method based on augmented reality according to the first aspect above and various possible designs of the first aspect.

In a fourth aspect, an embodiment of the present disclosure provides a computer-readable storage medium, the computer-readable storage medium stores a computer-executable instruction, and when a processor executes the computer-executable instruction, the display method based on augmented reality according to the first aspect above and various possible designs of the first aspect is implemented.

In a fifth aspect, an embodiment of the present disclosure provides a computer program product, including a computer-executable instruction, when the computer-executable instruction is executed by a processor, the display method based on augmented reality according to the first aspect above and various possible designs of the first aspect is implemented.

In a sixth aspect, an embodiment of the present disclosure provides a computer program, when the computer program is executed by a processor, the display method based on augmented reality according to the first aspect above and various possible designs of the first aspect is implemented.

According to the display method based on augmented reality, device, storage medium, and program product provided by embodiments of the present disclosure, a real-time scene image is acquired, then a head image of a target object is acquired from the real-time scene image if the real-time scene image includes a face image of the target object, where the head image of the target object includes the face image of the target object; a virtual image of the target object is generated according to the head image; and the virtual image of the target object is displayed in the real-time scene image based on an augmented reality display technology. In the present embodiment, a virtual image of a target object is generated by acquiring a head image of the target object, which may avoid the problem that the virtual image needs to be pre-designed and the image is fixed and single, and meets the diverse needs of users, improves the user's willingness and experience to use the augmented reality technology by displaying the virtual image at a target position in a real-time scene image through the augmented reality technology.

BRIEF DESCRIPTION OF DRAWINGS

In order to illustrate the technical solutions in the embodiments of the present disclosure or prior art more clearly, the following is a brief description of the accompanying drawings to be used in the description of the embodiments or the prior art. Obviously, the accompanying drawings in the following description are some embodiments of the present disclosure, and for those skilled in the art, other accompanying drawings may also be obtained from these accompanying drawings without paying any creative labor.

DESCRIPTION OF EMBODIMENTS

In order to make the purposes, technical solutions and advantages of the embodiments of the present disclosure clearer, the technical solutions in the embodiments of the present disclosure will be described clearly and completely below in combination with the accompanying drawings in the embodiments of the present disclosure, and it is clear that the embodiments described are a part of the embodiments of the present disclosure, but not all of them. Based on the embodiments in the present disclosure, all other embodiments obtained by those skilled in the art without making creative labor fall within the scope of protection of the present disclosure.

One application of the AR technology in the prior art is to superimpose a virtual model in the real world, such as a cartoon character model, an animal model, etc. Users may interact with the virtual model through a gesture and other means, and the virtual model may make a specific response.

AR virtual model in the prior art is usually fixed and an image of the virtual model is pre-designed by a developer, which renders an image of the virtual model relatively single and cannot meet the diverse needs of users, and affects the user's willingness and experience to use the AR technology.

In order to solve the above technical problem, the present disclosure may provide for a user a method through which an AR virtual image is generated based on a face image, where the user may acquire a real-time scene image through an image acquiring unit of an electronic device, and if the real-time scene image includes a face image of a target object, then acquire a head image of the target object from the real-time scene image, where the head image of the target object includes the face image of the target object, where the target object may be a human, in an embodiment, also an animal, such as a cat, a dog, etc.; then generate a virtual image of the target object according to the head image, for example, a limb grows on the head image, and the limb may make various preset actions; and then display the virtual image of the target object in the real-time scene image based on an augmented reality display technology, thus avoiding the problem that the AR virtual image needs to be pre-designed and the image is fixed and single, and realizes the generation of AR virtual images of a variety of target objects such as human or animals according to a user's needs, thereby meeting the user's diverse needs and improving the user's willingness and experience to use the AR.

Embodiments of the present disclosure may be applied to any electronic device with an AR function, such as a smartphone, a tablet computer, a wearable device, etc. And application scenarios of embodiments of the present disclosure may include, for example, an electronic device collecting a real-time scene image through its image acquiring unit, generating a virtual image of a target object based on a head image of the target object in the scene image, and finally augmented-displaying the virtual image corresponding to the target object in the real-time scene through the augmented reality display method in the embodiments of the present disclosure, where the augmented-displaying includes: displaying the virtual image of the target object based on the augmented reality display technology, for example, a real-time scene image includes a face image of a character A, generating a virtual image of the character A by using the virtual image generation method in the embodiments of the present disclosure, growing a limb on a head image of the character A, and the limb may perform a variety of preset actions, after applying the augmented reality display method in the embodiments of the present disclosure, the virtual image of the character A may be augmented and displayed in the real-time scene image and further dynamically displayed in a form of animation, so that the virtual image of the character A moves in the real-time scene.

Figure 1:
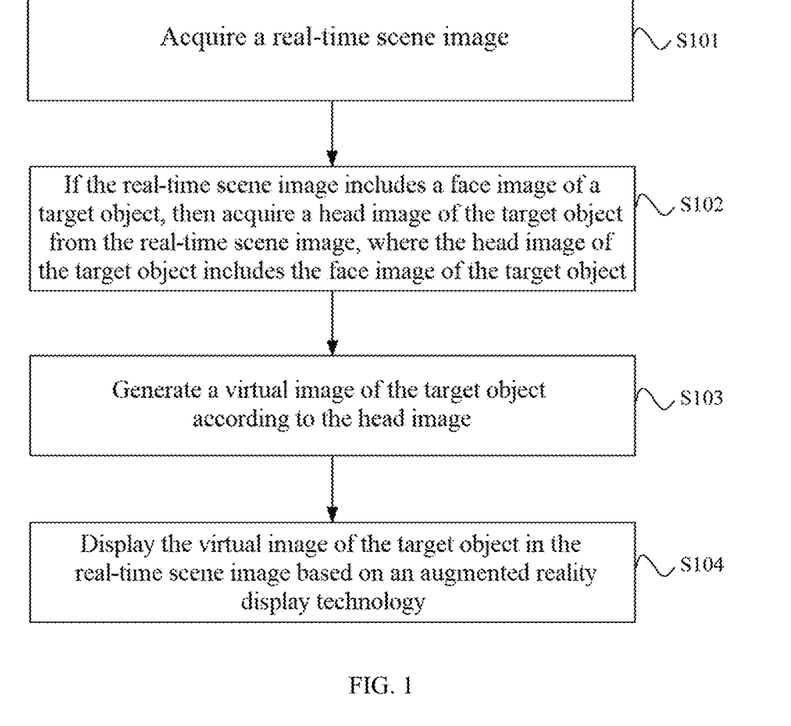
FIG. 1 is a schematic flowchart of a display method based on augmented reality provided by an embodiment of the present disclosure.

Referring to FIG. 1, FIG. 1 is a schematic flowchart I of a display method based on augmented reality provided by an embodiment of the present disclosure. The method of the present embodiment may be applied in an electronic device with an AR function, and the display method based on augmented reality includes:

S101, acquiring a real-time scene image.

In the present embodiment, an image acquiring unit of an electronic device such as a camera may capture a real-time scene image and display the same in a displaying unit of the electronic device, so that a user may see the real-time scene image captured by the image acquiring unit in the displaying unit of the electronic device in real-time, where the electronic device includes but not limited to a smart phone, a tablet computer, a wearable device, etc.

S102, if the real-time scene image includes a face image of a target object, then acquiring a head image of the target object from the real-time scene image, where the head image of the target object includes the face image of the target object.

In the present embodiment, the real-time scene image may include a face image of a target object, where the target object may be a face image of a person, in an embodiment, it may also be a face image of an animal, such as a cat, a dog, etc. The electronic device may perform face detection on the real-time scene image, and when determining the face image of the target object is included in the real-time scene image, acquiring a head image of the target object from the real-time scene image, and the head image of the target object includes the face image of the target object, that is, the head image of the target object may include not only the face image of the target object, but also a hair image, a headdress image, etc., other than the face of the target object. Regarding the process of acquiring the head image of the target object from the real-time scene image, any image segmentation method in the prior art may be used, as long as segmentation of the head image of the target object from the real-time scene image is achieved, such as a human head image segmentation algorithm, etc., which is not limited here. In an embodiment, the head image of the target object may also be acquired from a pre-taken photo or acquired by other means.

S103, generating a virtual image of the target object according to the head image.

In the present embodiment, after acquiring the head image of the target object, the electronic device may generate the virtual image of the target object according to the head image of the target object, where the virtual image may have a limb and/or a wearing object, and the limb and/or wearing object may perform a specific action, such as growing limbs on the head image of the target object, and the limbs may perform specific actions such as running, jumping, waving hands, waving an object, etc., for another example, adding a headdress to the head image of the target object, and the headdress may demonstrate a specific action such as swaying in wind, etc.

In an embodiment, when generating the virtual image of the target object based on the head image, it is possible to synthesize the head image with a preset animation material to generate the virtual image of the target object.

That is, in the present embodiment, a body movement of the virtual image and a movement of a wearing object may be preset to generate corresponding animation materials for a subsequent synthesis process, that is, adding these animation materials to the head image to acquire the virtual image of the target object, and the virtual image may perform a specific movement according to a playback of the animation materials.

S104, displaying the virtual image of the target object in the real-time scene image based on an augmented reality display technology.

In the present embodiment, after acquiring the virtual image of the target object, the electronic device may display the virtual image of the target object in the real-time scene image through the augmented reality technology, that is, superimpose the virtual image into the real real-time scene image through the augmented reality technology to achieve the effect of augmented displaying. Where the virtual image may be displayed at any position in the real-time scene image, for example, the position may be any flat area detected in the real-time scene image, or it may be a target position specified by the user in the real-time scene image, which may be not limited in the present embodiment.

In an embodiment, the user may drag the acquired head image of the target object from an initial position to a certain position in the real-time scene image, the virtual image of the target object is then displayed at that position based on the augmented reality display technology; or the virtual image of the target object generated based on a copied head image of the target object may be displayed first, and then the virtual image is displayed at a certain position in the real-time scene image based on the user's dragging operation.

In an embodiment, the user may also rotate, scale, move, etc., the displayed virtual image. For example, the user may issue a control instruction for the virtual image on a display interface of the electronic device, and the control instruction may include, but is not limited to, a rotation control instruction, a scaling-up control instruction, a movement control instruction, and a scaling-down control instruction, and the electronic device controls the virtual image accordingly in response to the user's control instruction for the virtual image. It should be noted that the rotation in the present embodiment may include an angle change of the virtual image in any case, the movement may include a position change of the virtual image in any case, and the scaling may include a size change of the virtual image in any case. Of course, in the present embodiment, the user may also perform other interaction processes with the virtual image, which will not be repeated here for the sake of brevity.

According to the display method based on augmented reality provided by the present embodiment, a real-time scene image is acquired, then a head image of a target object is acquired from the real-time scene image if the real-time scene image includes a face image of the target object, where the head image of the target object includes the face image of the target object; a virtual image of the target object is generated according to the head image; and the virtual image of the target object is displayed in the real-time scene image based on an augmented reality display technology. In the present embodiment, a virtual image of a target object is generated by acquiring a head image of the target object, which may avoid the problem that the virtual image needs to be pre-designed and the image is fixed and single, and meets the diverse needs of users, improves the user's willingness and experience to use the augmented reality technology by displaying the virtual image at a target position in a real-time scene image through the augmented reality technology.

On the basis of any of the above embodiments, the generating a virtual image of the target object according to the head image according to S103 may specifically be: synthesizing the head image with a preset animation material to generate the virtual image of the target object. In an embodiment, the virtual image may have a limb and/or a wearing object, and the limb and/or wearing object may perform a specific action.

Figure 2:
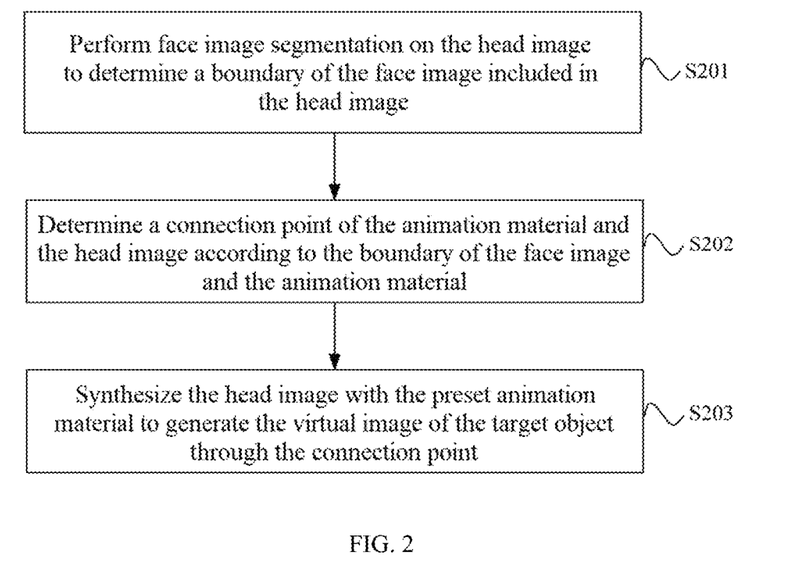
FIG. 2 is a schematic flowchart of a display method based on augmented reality provided by another embodiment of the present disclosure.

As shown in FIG. 2, the synthesizing the head image with a preset animation material to generate the virtual image of the target object may specifically include:

S201, performing face image segmentation on the head image to determine a boundary of the face image included in the head image;

S202, determining a connection point of the animation material and the head image according to the boundary of the face image and the animation material, where the connection point is located on the boundary of the face image, or in a preset area near the boundary of the face image; and S203, synthesizing the head image with the preset animation material to generate the virtual image of the target object through the connection point.

In the present embodiment, considering that the head of the target object may have long hair or headdress, if a limb and/or a wearing object are added to the boundary of the head image directly, it may make the limb and/or wearing object unreasonably positioned in the virtual image of the target object, thus rendering the display effect of the virtual image unnatural. Therefore, in the present embodiment, face image segmentation may be performed on the head image to determine the boundary of the face image included in the head image, and determine the connection point between the animation material and the head image on the boundary of the face image, or a preset area near the boundary of the face image, that is, the limb and/or wearing object added to a final animation material are on or near the boundary of the face of the target object.

In the present embodiment, any face image segmentation algorithm may be used for performing face image segmentation of the head image, which is not limited here, where the boundary of the face image after segmentation may be a bounding box, such as a rectangular bounding box, a circular bounding box, an elliptical bounding box, and the face image may be framed within the bounding box, or the boundary of the face image may also be an outline of the face image directly.

In the present embodiment, when determining a connection point of the animation material and the head image, factors including the boundary of the face image and the animation material may be considered, where the connection point is a position where the animation material is combined with the head image, such as positions where limbs are added to the head image, and a position where a headdress (such as a hat) is added to the head image. Specifically, if the animation material includes limb animation materials, the connection points may be on left and right sides of the boundary of the face image, and if the animation material includes a wearing object, then determining an appropriate connection point according to a boundary of the wearing object in the face image, for example, a connection point of a hat may be above the boundary of the face image; in addition, the connection point may also be determined according to a size, an aspect ratio and etc. of the boundary of the face image, for example, for the limb animation materials, if the boundary of the face image is relatively thin and tall, the connection points of the upper limbs and the connection points of the lower limbs may be relatively larger in spacing, while if the boundary of the face image is relatively short and fat, the connection points of the upper limbs and the connection points of the lower limbs may be relatively smaller in spacing, and the positions of the connection points are relatively compact.

Figure 3A:
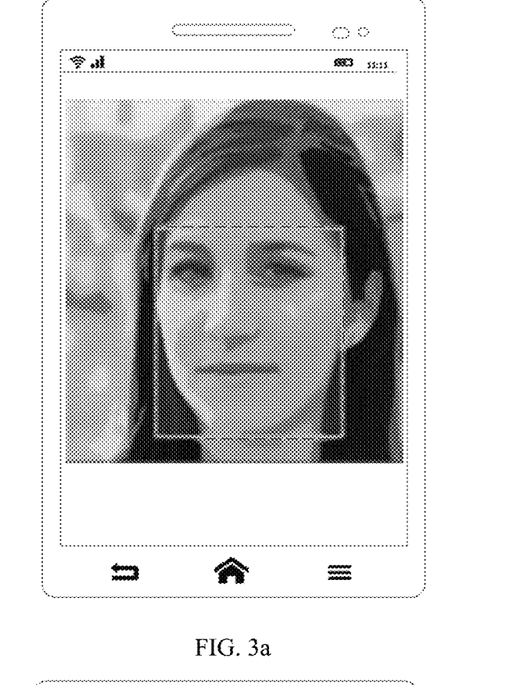
FIG. 3a is an exemplary diagram of a real-time scene image including a face image of a target object provided by an embodiment of the present disclosure.
Figure 3B:
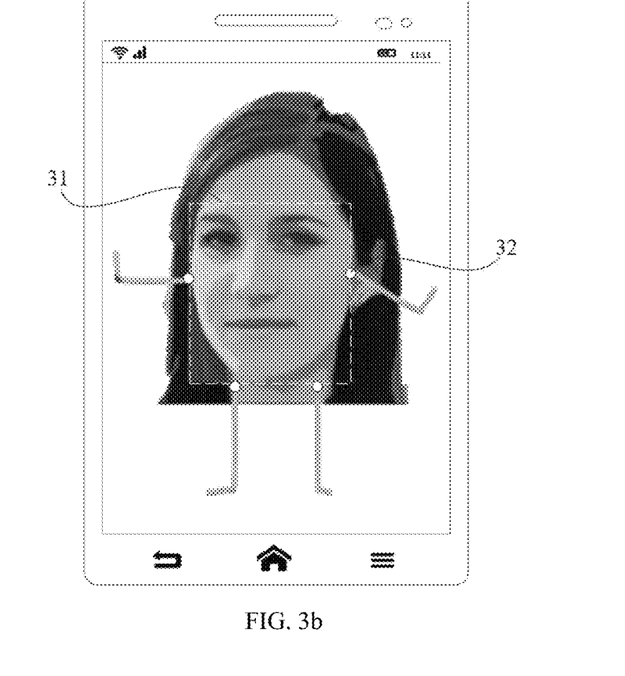
FIG. 3b is an exemplary diagram of determining a boundary of a face image provided by an embodiment of the present disclosure.
Figure 3C:
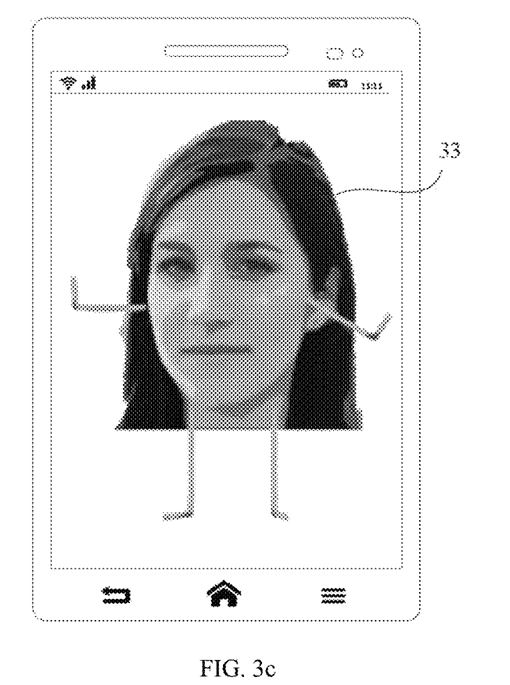
FIG. 3c is an exemplary diagram of generating a virtual image of a target object provided by an embodiment of the present disclosure.
Figure 3D:
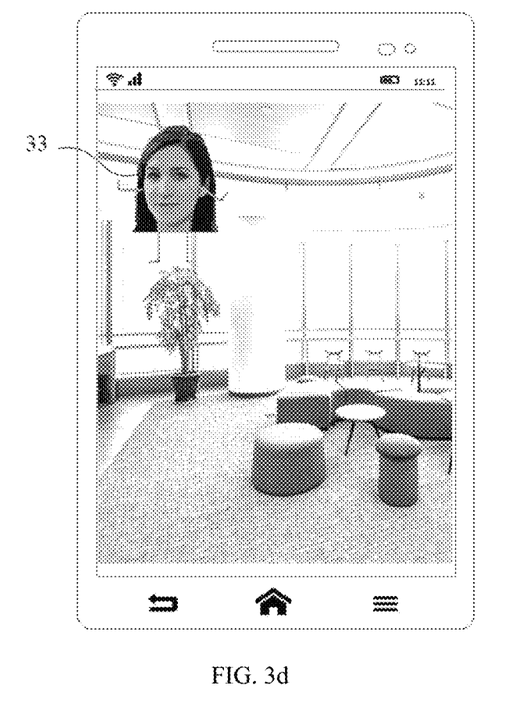
FIG. 3d is an exemplary diagram of displaying a virtual image of a target object in a real-time scene image provided by an embodiment of the present disclosure.

As an example, as shown in FIG. 3a, when it is determined that the face image of the target object is included in the real-time scene image, the head image of the target object may be acquired; face image segmentation is performed on the head image to determine a boundary of the face image included in the head image, as shown in FIG. 3b, where the rectangular frame is a boundary 31 of the face image; further, on the basis of the boundary 31 of the face image in FIG. 3b, a connection point 32 of the animation material and the head image is determined, and the connection point 32 is located on the boundary 31 of the face image; the head image is synthesized with the preset animation material through the connection point 32 to generate a virtual image 33 of the target object, as shown in FIG. 3c; and finally, the virtual image 33 of the target object is displayed in the real-time scene image, as shown in FIG. 3d. It should be noted that the faces in FIG. 3a-d are fictitious faces, but not real faces.

Figure 4:
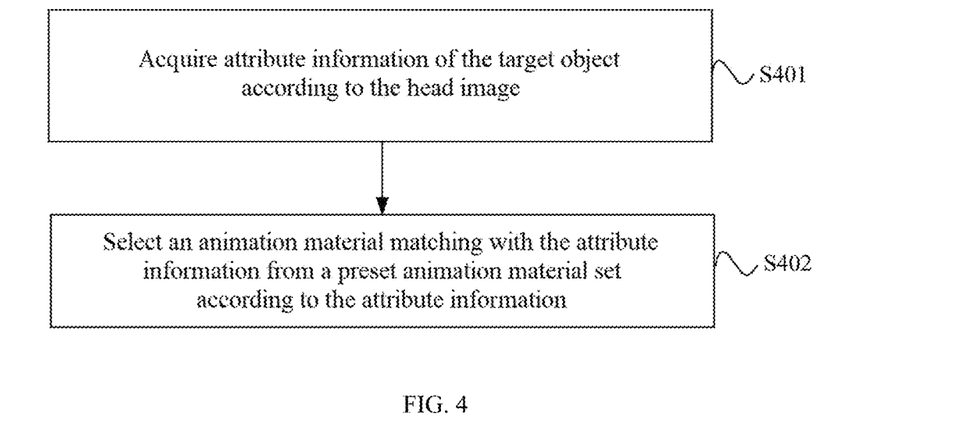
FIG. 4 is a schematic flowchart of a display method based on augmented reality provided by another embodiment of the present disclosure.

On the basis of any of the above embodiments, multiple different animation materials may be pre-configured, and before synthesis is required, an appropriate animation material may be selected, specifically, it may be selected by the user, or may be selected through the following process, in an embodiment, as shown in FIG. 4, before the synthesizing the head image with the preset animation material, further including:

S401, acquiring attribute information of the target object according to the head image; and S402, selecting an animation material matching with the attribute information from a preset animation material set according to the attribute information.

In the present embodiment, the attribute information of the target object may be acquired according to the head image, and then different body animation materials and/or headdress animation materials may be selected for different attribute information, and a virtual image matching with the attribute information may be acquired after the synthesis, thus making the virtual image richer and more diverse, presenting a richer display effect and improving user experience.

In an embodiment, the head image of the same target object may be synthesized with multiple different animation materials in turn to generate multiple different virtual images of the target object, where the different animation materials may be of different action types, so that the multiple different virtual images of the target object perform different actions respectively, such as a first virtual image is a jumping virtual image, and a second virtual image is a waving virtual image, accordingly, the different virtual images may be displayed successively during playback to show different actions; or the different animation materials may be configured with different clothing, wearing objects, etc.

In an embodiment, multiple different animation materials are displayed on an application program interface, the user may select one or more animation materials, and an electronic device may receive the selection instruction for the animation materials from the user, determine the animation material according to the selection instruction for the animation materials, and synthesize the head image of the target object in turn to generate multiple different virtual images of the target object respectively. In an embodiment, when displaying the virtual images of the target object in a real-time scene image, the multiple different virtual images generated may be displayed in the real-time scene image at the same time, or may be sequentially displayed in the real-time scene image in a certain order, or may be displayed according to other display strategies.

Further, before displaying the virtual image of the target object in the real-time scene image, if multiple virtual images are generated, the electronic device may receive a selection instruction for the virtual images from the user, and select one or more virtual images of the target object to be displayed according to the selection instruction for the virtual images. If the user selects multiple virtual images, these virtual images may be displayed in the real-time scene image at the same time, or may be displayed in the real-time scene image in a certain order, for example, the user may set a display order of the multiple virtual images, or use the order in which the user selects the virtual images as the display order of the multiple virtual images, or the virtual images may also be displayed according to other display strategies, which will not be repeated here.

Alternatively, the user may also switch the displayed virtual image during the process of displaying the virtual images in the real-time scene image, for example, a first virtual image of the target object is currently displayed in the real-time scene image, and a second virtual image of the target object is displayed after a switching instruction is received.

Alternatively, the user may also add other virtual images to the real-time scene image during the process of displaying the virtual images in the real-time scene image, for example, the first virtual image of the target object is currently displayed in the real-time scene image, and the second virtual image of the target object may be added to the real-time scene image after an adding instruction is received, that is, the first virtual image of the target object and the second virtual image of the target object are displayed in the real-time scene image at the same time. Of course, when multiple virtual images of the target object are displayed in the real-time scene image at the same time, one of the virtual images may also be deleted according to a deleting instruction from the user. It should be noted that if the virtual image to be added has been generated in advance, an alternative virtual image is displayed in the application interface directly after the adding instruction is received; if the virtual image to be added has not been generated in advance, then the user may re-select an animation material to generate the required virtual image.

Through the above process, richer virtual images may be provided for the user to choose, and the user may switch and add or delete the virtual image when displaying the virtual image, thus increasing the interaction fun between the user and the electronic device and improving user experience.

Figure 5:
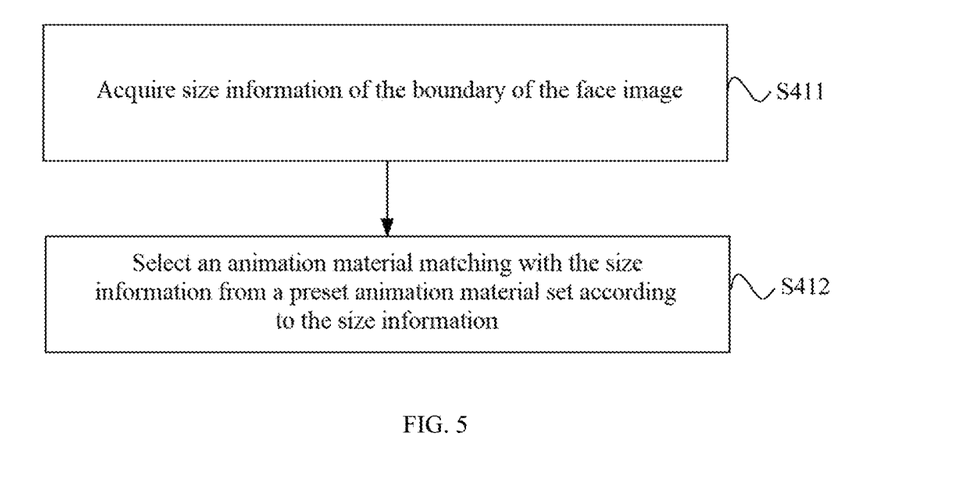
FIG. 5 is a schematic flowchart of a display method based on augmented reality provided by another embodiment of the present disclosure.

In another embodiment, as shown in FIG. 5, before the synthesizing the head image with the preset animation material, further includes:

S411, acquiring size information of the boundary of the face image; and

S412, selecting an animation material matching with the size information from a preset animation material set according to the size information.

In the present embodiment, the size information of the boundary of the face image may be acquired according to the boundary of the face image, such as an aspect ratio, shape information, etc., and different limb animation materials and/or headdress animation materials may be selected for different aspect ratios and shape information of the boundary of the face image, for example, both hands are needed to hold a bamboo pole in a dragon dance animation material, or both hands are needed to hold a banner in a banner-raising animation material, if the boundary of the face image is too short and fat, the animation material may need to be stretched horizontally, resulting in a disproportionate ratio or an image distortion, at this time, the animation material cannot match with the face image, therefore, in the present embodiment, an animation material that matches with the size information of the boundary of the face image may be selected to avoid the above situation.

On the basis of any of the above embodiments, the synthesizing the head image with the preset animation material specifically further includes:

adjusting the animation material according to the head image, and synthesizing the head image with the adjusted animation material.

In the present embodiment, when synthesizing the head image with the animation material, there will be a situation that the size and aspect ratio may not match, and the animation material may be adjusted so that the adjusted animation material may match with the size and aspect ratio of the head image. For example, for the animation material of a hat, a width of the animation material may be adjusted so that the width of the hat and the width of the head are the same, thereby enhancing the display effect and improving the user experience.

Figure 6:
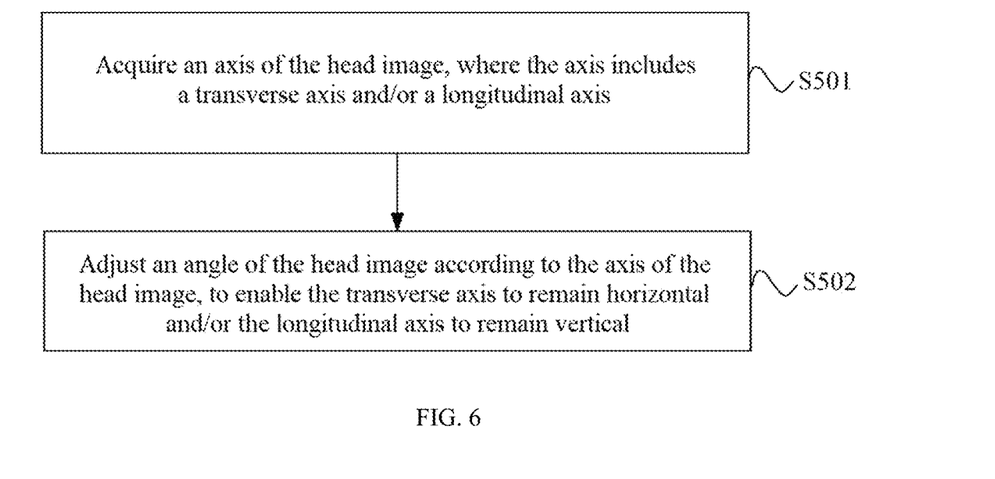
FIG. 6 is a schematic flowchart of a display method based on augmented reality provided by another embodiment of the present disclosure.

On the basis of any of the above embodiments, as shown in FIG. 6, before the synthesizing the head image with the preset animation material to generate the virtual image of the target object may further include:

S501, acquiring an axis of the head image, where the axis includes a transverse axis and/or a longitudinal axis; and S502, adjusting an angle of the head image according to the axis of the head image, to enable the transverse axis to remain horizontal and/or the longitudinal axis to remain vertical.

In the present embodiment, in order to ensure that the head faces upward in the head image, the angle of the head image may be adjusted, specifically, the axis of the head image may be acquired, for example, the horizontal axis may be determined by positions of eyes, the longitudinal axis may be determined by positions of the eyes and nose, etc., of course, the determination of the axes of the head image is not limited to the above-mentioned methods, which will not be repeated here. Further, the angle of the head image is adjusted according to the axes of the head image, to enable the transverse axis to remain horizontal, and/or, the longitudinal axis to remain vertical.

Further, on the basis of any of the above embodiments, the electronic device may also play the animation material to perform motion control on the virtual image of the target object, that is, to enable the limbs and/or wearing objects of the virtual image of the target object to exhibit a corresponding motion.

Specifically, the electronic device may play the animation material according to a preset animation frame(s) of the animation material to perform motion control on the virtual image of the target object. That is, the animation material may include preset animation frames in which specific animations of the limbs and/or wearing objects may be preset, and when the head image is synthesized with the animation material, the head image is synthesized with each preset animation frame of the animation material to acquire a virtual image of the target object for each frame, thus when the virtual image of the target object is displayed, the animation material is played, that is, the synthesized virtual image of each frame of the target object is played in turn, and the display effect of performing motion control on the virtual image of the target object is presented.

On the basis of any of the above embodiments, the acquiring the head image of the target object from the real-time scene image if the real-time scene image includes the face image of the target object according to S102 may specifically include:

if the real-time scene image includes the face image of the target object and satisfies a first preset condition, then acquiring the head image of the target object from the real-time scene image;

where the first preset condition includes at least one of the following:

an area ratio of the face image in the real-time scene image exceeds a preset ratio threshold; or, the face image is located in a central area of the real-time scene image; or, a selection instruction for the target object is received from a user.

In the present embodiment, the head image of the target object is acquired from the real-time scene image only in a condition that the first preset condition is satisfied.

Specifically, in an embodiment, the area ratio of the face image in the real-time scene image may be acquired, and the head image of the target object is acquired from the real-time scene image only when the area ratio of the face image in the real-time scene image exceeds the preset ratio threshold.

In an embodiment, it is also possible to determine whether the face image is located in the central area of the real-time scene image, and if it is determined that the face image is located in the central area of the real-time scene image, then the head image of the target object is acquired from the real-time scene image.

In an embodiment, it may also be selected by the user, and the user may acquire the head image of the target object from the real-time scene image after the user has selected the target object in the real-time scene image. Of course, the present embodiment may not be limited to the above conditions, and other conditions are also acceptable, which will not be repeated here.

It should be noted that, when the real-time scene image includes face images of multiple objects, the above conditions may also be used to select at least one of the objects as the target object, such as selecting an object from the multiple objects whose face image has an area ratio in the real-time scene image exceeding the preset ratio threshold as the target object, or selecting an object whose face image is located in the central area of the real-time scene image as the target object, or specifying which object is to be used as the target object by the user, and thus acquiring the head image of the target object from the real-time scene image.

In addition, in the above embodiment, multiple virtual images of the target object may also be displayed in the real-time scene image, and the above-mentioned display method based on augmented reality may be used for each target object, which will not be repeated here.

On the basis of the above embodiment, if a second preset condition is satisfied, then acquiring an image of a target item from the real-time scene image, generating a virtual image of the target item according to the target item, and displaying the virtual image of the target item in the real-time scene image based on the augmented reality display technology;

where the second preset condition includes at least one of the following:

the face image is not included in the real-time scene image; or, the area ratio of the face image in the real-time scene image does not exceed a preset ratio threshold in the real-time scene image; or, the face image in the real-time scene image is not located in the central area of the real-time scene image; or, the face image in the real-time scene image is a profile of the target object, and a deflection angle of the profile of the target object exceeds a preset angle threshold; or, a selection instruction for the target item in the real-time scene image is received from a user.

In the present embodiment, when the second preset condition is satisfied, acquiring the image of the target item from the real-time scene image, generating the virtual image of the target item according to the target item, and the virtual image may have a body movement and/or an expression movement, for example, when the image of the target item is an image of a mango, then a corresponding virtual image may grow limbs and a facial expression on the image of the mango, and its limbs and expression may make a specific movement, thus displaying the virtual image of the target item in the real-time scene image based on the augmented reality display technology.

Specifically, in an embodiment, a priority of the face image of the target object may be set higher than that of the target item, that is, if the face image of the target object is included in the real-time scene image, then generating a virtual image of the target object, otherwise, generating a virtual image of the target item, where the target item may be an item in the real-time scene image with a large difference in color from the background, or an item in the central area of the real-time scene image, or an item with a largest area in the real-time scene image, or an item specified by the user.

In an embodiment, although there exists a face image in the real-time scene image, but an area ratio of the face image in the real-time scene image does not exceed a preset ratio threshold, then the virtual image of the target item may be generated at this time.

In an embodiment, although there is a face image in the real-time scene image, but the face image is not located in the central area of the real-time scene image, then the virtual image of the target item may be generated at this time.

In an embodiment, although there is a face image in the real-time scene image, the face image in the real-time scene image is a profile of the target object, and a deflection angle of the profile of the target object exceeds a preset angle threshold, that is, the face image in the image may not be displayed completely at this time, therefore, the virtual image of the target object may not be generated at this time, but the virtual image of the target item may be generated. Of course, in this case, some animation materials suitable for the profile may be pre-configured, thus generating the virtual image of the target object in the case of the profile.

It should be noted that, in the above embodiment, multiple virtual images of the target item may also be displayed in the real-time scene image, or the virtual image of the target item and the virtual image of the target object may be displayed simultaneously.

According to the display method based on augmented reality provided by the above-mentioned embodiments, the problem that the virtual image needs to be pre-designed and the image is fixed and single may be avoided by generating the virtual image, thus meeting the diverse needs of the user, and improving the user's willingness to use the augmented reality technology and user experience by displaying the virtual image at a target position in a real-time scene image through the augmented reality technology.

Figure 7:
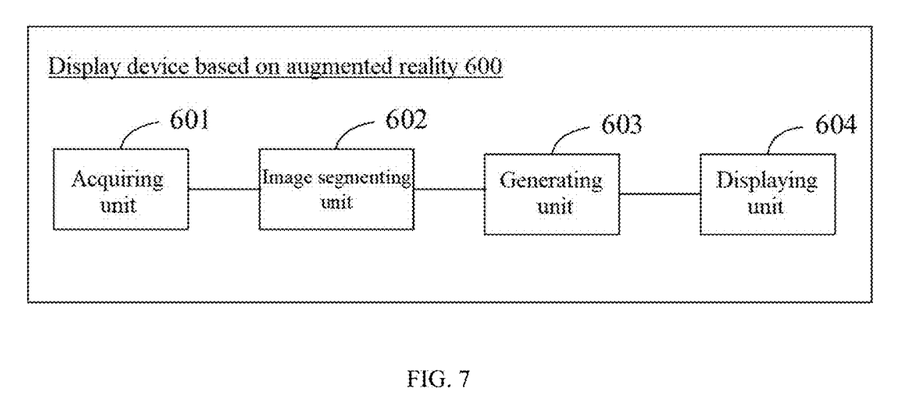
FIG. 7 is a structural block diagram of a display device based on augmented reality provided by an embodiment of the present disclosure.

Corresponding to the display method based on augmented reality in the above embodiment, FIG. 7 is a structural block diagram of a display device based on augmented reality provided by an embodiment of the present disclosure. For the convenience of explanation, only those portions relevant to the embodiments of the present disclosure are shown. Referring to FIG. 7, the display device 600 based on augmented reality includes: an acquiring unit 601, an image segmenting unit 602, a generating unit 603, and a displaying unit 604.

The acquiring unit 601, configured to acquire a real-time scene image;

the image segmenting unit 602, configured to, in a condition that the real-time scene image includes a face image of a target object, acquire a head image of the target object from the real-time scene image, where the head image of the target object includes the face image of the target object;

the generating unit 603, configured to generate a virtual image of the target object according to the head image; and the displaying unit 604, configured to display the virtual image of the target object in the real-time scene image based on an augmented reality display technology.

In an embodiment of the present disclosure, when generating the virtual image of the target object according to the head image, the generating unit 603 is configured to: synthesize the head image with a preset animation material to generate the virtual image of the target object.

In an embodiment of the present disclosure, when synthesizing the head image with the preset animation material to generate the virtual image of the target object, the generating unit 603 is configured to:

perform face image segmentation on the head image to determine a boundary of the face image included in the head image;

determine a connection point of the animation material and the head image according to the boundary of the face image and the animation material; where the connection point is located on the boundary of the face image, or in a preset area near the boundary of the face image; and synthesize the head image with the preset animation material to generate the virtual image of the target object through the connection point.

In an embodiment of the present disclosure, before synthesizing the head image with the preset animation material, the generating unit 603 is further configured to:

acquire attribute information of the target object according to the head image; and select an animation material matching with the attribute information from a preset animation material set according to the attribute information.

In an embodiment of the present disclosure, before synthesizing the head image with the preset animation material, the generating unit 603 is further configured to:

acquire size information of the boundary of the face image; and select an animation material matching with the size information from a preset animation material set according to the size information.

In an embodiment of the present disclosure, when synthesizing the head image with the preset animation material, the generating unit 603 is configured to:

adjust the animation material according to the head image, and synthesize the head image with the adjusted animation material.

In an embodiment of the present disclosure, before synthesizing the head image with the preset animation material to generate the virtual image of the target object, the generating unit 603 is further configured to:

acquire an axis of the head image, where the axis includes a transverse axis and/or a longitudinal axis; and adjust an angle of the head image according to the axis of the head image, to enable the transverse axis to remain horizontal and/or the longitudinal axis to remain vertical.

In an embodiment of the present disclosure, in a condition that the real-time scene image includes the face image of the target object, when acquiring the head image of the target object from the real-time scene image, the image segmenting unit 602 is configured to:

if the real-time scene image includes the face image of the target object and satisfies a first preset condition, then acquire the head image of the target object from the real-time scene image; where the first preset condition includes at least one of the following:

an area ratio of the face image in the real-time scene image exceeds a preset ratio threshold; or, the face image is located in a central area of the real-time scene image; or, a selection instruction for the target object is received from a user.

In an embodiment of the present disclosure, the image segmenting unit 602 is further configured to, in a condition that a second preset condition is satisfied, acquire an image of a target item from the real-time scene image;

the generating unit 603 is further configured to generate a virtual image of the target item according to the target item; and the displaying unit 604 is further configured to display the virtual image of the target item in the real-time scene image based on the augmented reality display technology;

where the second preset condition includes at least one of the following:

the face image is not included in the real-time scene image; or, the area ratio of the face image in the real-time scene image does not exceed a preset ratio threshold in the real-time scene image; or, the face image in the real-time scene image is not located in the central area of the real-time scene image; or, the face image in the real-time scene image is a profile of the target object, and a deflection angle of the profile of the target object exceeds a preset angle threshold; or, a selection instruction for the target item in the real-time scene image is received from a user.

In an embodiment of the present disclosure, the displaying unit 604 is further configured to:

play the animation material to perform motion control on the virtual image of the target object.

In an embodiment of the present disclosure, when playing the animation material to perform motion control on the virtual image of the target object, the displaying unit 604 is configured to:

play the animation material according to a preset animation frame of the animation material to perform motion control on the virtual image of the target object.

In an embodiment of the present disclosure, the displaying unit 604 is further configured to:

in response to a control instruction for the virtual image of the target object from a user, control the virtual image of the target object accordingly, where the control instruction includes at least one of the following: a rotation control instruction, a scaling-up control instruction, a movement control instruction, and a scaling-down control instruction.

The present embodiment provides a display device based on augmented reality, which may be used to perform the technical solutions of the method embodiments described above with similar implementation principles and technical effects, which will not be repeated here.

Figure 8:
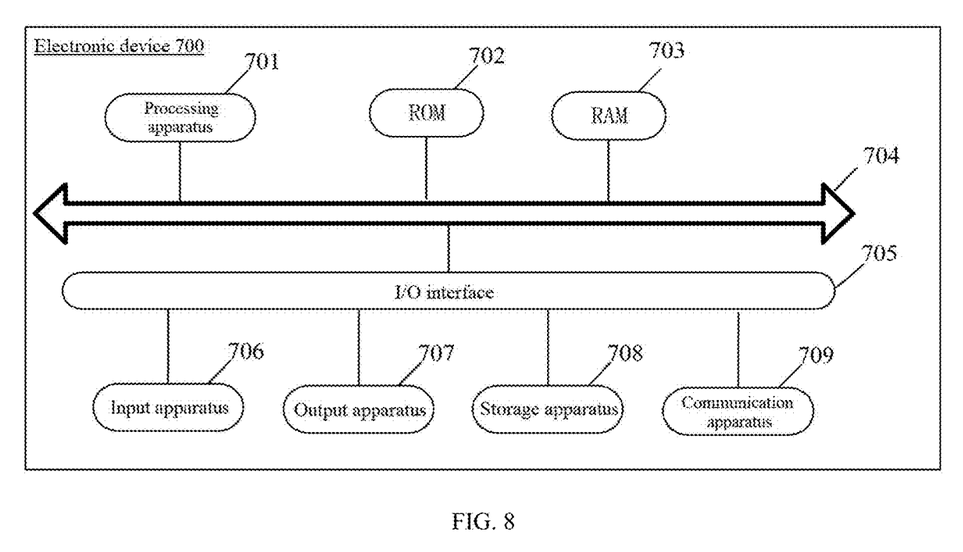
FIG. 8 is a structural diagram of hardware of an electronic device provided by an embodiment of the present disclosure.

Referring to FIG. 8, which illustrates a structural schematic diagram of an electronic device 700 suitable for implementing an embodiment of the present disclosure, the electronic device 700 may be a terminal device or a server. Where the terminal device may include, but is not limited to, a mobile terminal such as a mobile phone, a laptop, a digital radio receiver, a personal digital assistant (PDA), a tablet computer (PAD), a portable media player (PMP), a car terminal (for example, a car navigation terminal), etc., and a fixed terminal such as a digital TV, a desktop computer, etc. The electronic device illustrated in FIG. 8 is only an example and should not impose any limitations on the function and scope of use of the embodiments of the present disclosure As shown in FIG. 8, the electronic device 700 may include a processing apparatus 701 (for example, a central processor, a graphics processor, etc.), which may execute various appropriate actions and processes according to a program stored in a read only memory (ROM) 702 or a program loaded from a storage device 708 into a random access memory (RAM) 703. In the RAM 703, various programs and data required for an operation of the electronic device 700 are also stored. The processing apparatus 701, the ROM 702, and the RAM 703 are connected to each other via a bus 704. An input/output (I/O) interface 705 is also connected to the bus 704.

Typically, the following devices may be connected to the I/O interface 705: an input apparatus 706 including, for example, a touch screen, a touch pad, a keyboard, mouse, a camera, a microphone, an accelerometer, a gyroscope, etc.; an output apparatus 707 including, for example, a liquid crystal display (LCD), a speaker, a vibrator, etc.; a storage apparatus 708 including, for example, a magnetic tape, a hard disk, etc.; and a communication apparatus 709. The communication apparatus 709 may allow the electronic device 700 to communicate wirelessly or wired with other devices to exchange data. While FIG. 8 illustrates the electronic device 700 with various apparatuses, it should be understood that it is not required to implement or have all of the apparatuses illustrated. More or fewer apparatuses may alternatively be implemented or available.

In particular, according to the embodiments of the present disclosure, the processes described above with reference to the flowchart may be implemented as computer software programs. For example, the embodiments of the present disclosure include a computer program product, which includes a computer program carried on a computer-readable medium, the computer program containing program codes for performing the method illustrated in the flowchart. In such an embodiment, the computer program may be downloaded and installed from the network via the communication apparatus 709, or installed from the storage apparatus 708, or installed from the ROM 702. When the computer program is executed by the processing apparatus 701, the above-mentioned functions defined in the methods of the embodiments of the present disclosure are executed.

It should be noted that, the above-mentioned computer-readable medium in the present disclosure may be a computer-readable signal medium or a computer-readable storage medium, or any combination of the above two. The computer-readable storage medium may be, for example, but not limited to, an electrical, magnetic, optical, electromagnetic, infrared, or semiconductor system, apparatus or device, or any combination of the above. More specific examples of the computer-readable storage medium may include, but not limited to, an electrical connection with one or more wires, a portable computer disk, a hard disk, a random access memory (RAM), a read only memory (ROM), an erasable programmable read-only memory (EPROM, or flash memory), an optical fiber, a portable compact disc read-only memory (CD-ROM), an optical storage device, a magnetic storage device, or any suitable combination of the above. In the present disclosure, the computer-readable storage medium may be any tangible medium that contains or stores a program that can be used by or in combination with an instruction execution system, apparatus, or device. However, in the present disclosure, a computer-readable signal medium may include a data signal propagated in baseband or as part of a carrier wave with computer-readable program codes embodied thereon. Such propagated data signal may take a variety of forms, including but not limited to, an electromagnetic signal, an optical signal, or any suitable combination of the above. The computer-readable signal medium may also be any computer-readable medium other than a computer-readable storage medium that may transmit, propagate, or transport a program for use by or in combination with an instruction execution system, apparatus, or device. The program code contained on the computer-readable medium may be transmitted by any suitable medium, including but not limited to: an electric wire, an optical cable, a radio frequency (RF), etc., or any suitable combination of the above.

The above-mentioned computer-readable medium may be included in the above-mentioned electronic device; or may exist alone without being assembled into the electronic device.

The above-mentioned computer-readable medium carries one or more programs, and when the above-mentioned one or more programs are executed by the electronic device, the electronic device is caused to execute the method shown in the above-mentioned embodiments.

Computer program codes for performing the operations of the present disclosure may be written in one or more programming languages or combinations thereof, the programming languages including object-oriented programming languages—such as Java, Smalltalk, C++, and also including conventional procedural programming languages—such as "C" language or similar programming languages. The program code may be executed entirely on the user's computer, partly on the user's computer, as a stand-alone package, partly on the user's computer and partly on a remote computer, or entirely on a remote computer or server. In the case of a remote computer, the remote computer may be connected to the user's computer over any kind of network—including a local area network (LAN) or a wide area network (WAN)—or, alternatively, may be connected to an external computer (for example, using an Internet service provider to connect over the Internet).

The flowcharts and block diagrams in the accompanying drawings illustrate the possible implementations of the architecture, functionality, and operation of systems, methods, and computer program products in accordance with various embodiments of the present disclosure. At this point, each box in the flowcharts or block diagrams may represent a module, program segment, or portion of code that contains one or more executable instructions for implementing a specified logical function. It should also be noted that in some implementations as replacements, the functions indicated in the boxes may also occur in a different order than those indicated in the accompanying drawings. For example, two boxes represented one after the other may actually be executed in substantially parallel, and they may sometimes be executed in the opposite order, depending on the functions involved. It should also be noted that each box in the block diagrams and/or flowcharts, and the combination of boxes in the block diagrams and/or flowcharts, may be implemented with a dedicated hardware-based system that performs the specified function or operation, or may be implemented with a combination of dedicated hardware and computer instructions.

The units described in the embodiments of the present disclosure may be implemented in a manner of software or in a manner of hardware. Where the name of the unit does not constitute a qualification of the unit itself in some cases.

The functions described above herein may be performed, at least in part, by one or more hardware logic components. For example, without limitation, exemplary types of hardware logic components that may be used include: a field programmable gate array (FPGA), an application specific integrated circuit (ASIC), an application specific standard parts (ASOP), an application specific standard parts (ASSP), a system on chip (SOC), a complex programmable logic device (CPLD), etc.

In the context of the present disclosure, a machine-readable medium may be a tangible medium that may contain or store a program that can be used by or in combination with an instruction execution system, apparatus, or device. The machine-readable medium may be a machine-readable signal medium or a machine-readable storage medium. The machine-readable medium may include, but not limited to, an electronic, magnetic, optical, electromagnetic, infrared, or semiconductor system, apparatus, or device, or any suitable combination of the above. More specific examples of machine-readable storage medium may include one or more wire-based electrical connections, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

In a first aspect, according to one or more embodiments of the present disclosure, a display method based on augmented reality is provided, including:

acquiring a real-time scene image;

if the real-time scene image includes a face image of a target object, then acquiring a head image of the target object from the real-time scene image, where the head image of the target object includes the face image of the target object;

generating a virtual image of the target object according to the head image; and displaying the virtual image of the target object in the real-time scene image based on an augmented reality display technology.

According to one or more embodiments of the present disclosure, the generating a virtual image of the target object according to the head image includes:

synthesizing the head image with a preset animation material to generate the virtual image of the target object.

According to one or more embodiments of the present disclosure, the synthesizing the head image with the preset animation material to generate the virtual image of the target object includes:

performing face image segmentation on the head image to determine a boundary of the face image included in the head image;

determining a connection point of the animation material and the head image according to the boundary of the face image and the animation material; where the connection point is located on the boundary of the face image, or in a preset area near the boundary of the face image; and synthesizing the head image with the preset animation material to generate the virtual image of the target object through the connection point.

According to one or more embodiments of the present disclosure, before the synthesizing the head image with a preset animation material, further including:

acquiring attribute information of the target object according to the head image; and selecting an animation material matching with the attribute information from a preset animation material set according to the attribute information.

According to one or more embodiments of the present disclosure, before the synthesizing the head image with a preset animation material, further including: acquiring size information of the boundary of the face image;

selecting an animation material matching with the size information from a preset animation material set according to the size information.

According to one or more embodiments of the present disclosure, the synthesizing the head image with the preset animation material includes:

adjusting the animation material according to the head image, and synthesizing the head image with the adjusted animation material.

According to one or more embodiments of the present disclosure, before the synthesizing the head image with the preset animation material to generate the virtual image of the target object, further including:

acquiring an axis of the head image, where the axis includes a transverse axis and/or a longitudinal axis; and adjusting an angle of the head image according to the axis of the head image, to enable the transverse axis to remain horizontal and/or the longitudinal axis to remain vertical.

According to one or more embodiments of the present disclosure, if the real-time scene image includes the face image of the target object, then acquiring the head image of the target object from the real-time scene image includes:

if the real-time scene image includes the face image of the target object and satisfies a first preset condition, then acquiring the head image of the target object from the real-time scene image; where the first preset condition includes at least one of the following:

an area ratio of the face image in the real-time scene image exceeds a preset ratio threshold; or, the face image is located in a central area of the real-time scene image; or, a selection instruction for the target object is received from a user.

According to one or more embodiments of the present disclosure, the method further includes:

if a second preset condition is satisfied, then acquiring an image of a target item from the real-time scene image, generating a virtual image of the target item according to the target item, and displaying the virtual image of the target item in the real-time scene image based on the augmented reality display technology; where the second preset condition includes at least one of the following:

the face image is not included in the real-time scene image; or, the area ratio of the face image in the real-time scene image does not exceed a preset ratio threshold in the real-time scene image; or, the face image in the real-time scene image is not located in the central area of the real-time scene image; or, the face image in the real-time scene image is a profile of the target object, and a deflection angle of the profile of the target object exceeds a preset angle threshold; or, a selection instruction for the target item in the real-time scene image is received from a user.

According to one or more embodiments of the present disclosure, the method further includes:

playing the animation material to perform motion control on the virtual image of the target object.

According to one or more embodiments of the present disclosure, the playing the animation material to perform motion control on the virtual image of the target object includes:

playing the animation material according to a preset animation frame of the animation material to perform motion control on the virtual image of the target object.

According to one or more embodiments of the present disclosure, the method further includes:

in response to a control instruction for the virtual image of the target object from a user, controlling the virtual image of the target object accordingly, where the control instruction includes at least one of the following: a rotation control instruction, a scaling-up control instruction, a movement control instruction, and a scaling-down control instruction.

In a second aspect, according to one or more embodiments of the present disclosure, a display device based on augmented reality is provided, including:

an acquiring unit, configured to acquire a real-time scene image;

an image segmenting unit, configured to, in a condition that the real-time scene image includes a face image of a target object, acquire a head image of the target object from the real-time scene image, where the head image of the target object includes the face image of the target object;

a generating unit, configured to generate a virtual image of the target object according to the head image; and a displaying unit, configured to display the virtual image of the target object in the real-time scene image based on an augmented reality display technology.

According to one or more embodiments of the present disclosure, when generating the virtual image of the target object according to the head image, the generating unit is configured to:

synthesize the head image with a preset animation material to generate the virtual image of the target object.

According to one or more embodiments of the present disclosure, when synthesizing the head image with the preset animation material to generate the virtual image of the target object, the generating unit is configured to:

perform face image segmentation on the head image to determine a boundary of the face image included in the head image;

determine a connection point of the animation material and the head image according to the boundary of the face image and the animation material; where the connection point is located on the boundary of the face image, or in a preset area near the boundary of the face image; and synthesize the head image with the preset animation material to generate the virtual image of the target object through the connection point.

According to one or more embodiments of the present disclosure, before synthesizing the head image with the preset animation material, the generating unit is further configured to:

acquire attribute information of the target object according to the head image; and select an animation material matching with the attribute information from a preset animation material set according to the attribute information.

According to one or more embodiments of the present disclosure, before synthesizing the head image with the preset animation material, the generating unit is further configured to:

acquire size information of the boundary of the face image; and select an animation material matching with the size information from a preset animation material set according to the size information.

According to one or more embodiments of the present disclosure, when synthesizing the head image with the preset animation material, the generating unit is configured to:

adjust the animation material according to the head image, and synthesize the head image with the adjusted animation material.

According to one or more embodiments of the present disclosure, before synthesizing the head image with the preset animation material to generate the virtual image of the target object, the generating unit is further configured to:

acquire an axis of the head image, where the axis includes a transverse axis and/or a longitudinal axis; and adjust an angle of the head image according to the axis of the head image, to enable the transverse axis to remain horizontal and/or the longitudinal axis to remain vertical.

According to one or more embodiments of the present disclosure, in a condition that the real-time scene image includes the face image of the target object, when acquiring the head image of the target object from the real-time scene image, the image segmenting unit is configured to:

if the real-time scene image includes the face image of the target object and satisfies a first preset condition, then acquire the head image of the target object from the real-time scene image; where the first preset condition includes at least one of the following:

an area ratio of the face image in the real-time scene image exceeds a preset ratio threshold; or, the face image is located in a central area of the real-time scene image; or, a selection instruction for the target object is received from a user.

According to one or more embodiments of the present disclosure, the image segmenting unit is further configured to, in a condition that a second preset condition is satisfied, acquire an image of a target item from the real-time scene image;

the generating unit is further configured to generate a virtual image of the target item according to the target item; and the displaying unit is further configured to display the virtual image of the target item in the real-time scene image based on the augmented reality display technology;

where the second preset condition includes at least one of the following:

the face image is not included in the real-time scene image; or, the area ratio of the face image in the real-time scene image does not exceed a preset ratio threshold in the real-time scene image; or, the face image in the real-time scene image is not located in the central area of the real-time scene image; or, the face image in the real-time scene image is a profile of the target object, and a deflection angle of the profile of the target object exceeds a preset angle threshold; or, a selection instruction for the target item in the real-time scene image is received from a user.

According to one or more embodiments of the present disclosure, the displaying unit is further configured to:

play the animation material to perform motion control on the virtual image of the target object.

According to one or more embodiments of the present disclosure, when playing the animation material to perform motion control on the virtual image of the target object, the displaying unit is configured to:

play the animation material according to a preset animation frame of the animation material to perform motion control on the virtual image of the target object.

According to one or more embodiments of the present disclosure, the displaying unit is further configured to:

in response to a control instruction for the virtual image of the target object from a user, control the virtual image of the target object accordingly, where the control instruction includes at least one of the following: a rotation control instruction, a scaling-up control instruction, a movement control instruction, and a scaling-down control instruction.

In a third aspect, according to one or more embodiments of the present disclosure, an electronic device is provided, including:

at least one processor and a memory;

the memory stores a computer-executable instruction; and the at least one processor executes the computer-executable instruction stored in the memory, to enable the at least one processor to execute the display method based on augmented reality according to the first aspect above and various possible designs of the first aspect.

In a fourth aspect, according to one or more embodiments of the present disclosure, a computer-readable storage medium is provided, the computer-readable storage medium stores a computer-executable instruction, and when a processor executes the computer-executable instruction, the display method based on augmented reality according to the first aspect above and various possible designs of the first aspect is implemented.

In a fifth aspect, according to one or more embodiments of the present disclosure, a computer program product is provided, including a computer-executable instruction, when the computer-executable instruction is executed by a processor, the display method based on augmented reality according to the first aspect above and various possible designs of the first aspect is implemented.

In a sixth aspect, according to one or more embodiments of the present disclosure, a computer program is provided, when the computer program is executed by a processor, the display method based on augmented reality according to the first aspect above and various possible designs of the first aspect is implemented.

The above description is merely a preferred embodiment of the present disclosure and an illustration of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalent features. For example, a technical solution which is formed by replacing the above-mentioned features with the technical features disclosed in the present disclosure (but not limited to) with similar functions.

Additionally, although operations are depicted in a specific order, it should not be interpreted as requiring that the operations be executed in the specific order shown or in sequential order. Under certain circumstances, multitasking and parallel processing may be advantageous. Likewise, although the above discussion contains several implementation-specific details, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the present subject matter has been described using language specific to structural features and/or methodological actions, it should be understood that the subject matter defined in the appended claims is not necessarily limited to the particular features or actions described above. Rather, the particular features and actions described above are merely exemplary forms of implementing the claims.

What is claimed is:

1. A display method based on augmented reality, comprising:
    acquiring a real-time scene image;
    in a condition that the real-time scene image comprises a face image of a target object, then acquiring a head image of the target object from the real-time scene image, wherein the head image of the target object comprises the face image of the target object;
    generating a virtual image of the target object according to the head image; and
    displaying the virtual image of the target object in the real-time scene image based on an augmented reality display technology;
    wherein the generating the virtual image of the target object according to the head image comprises:
    synthesizing the head image with a preset animation material to generate the virtual image of the target object, wherein the preset animation material comprises a limb animation material or a wearing object material;
    wherein the generated virtual image of the target object has a limb corresponding to the limb animation material or a wearing object corresponding to the wearing object material;
    wherein before the synthesizing the head image with the preset animation material to generate the virtual image of the target object, the method further comprises:
    acquiring an axis of the head image, wherein the axis comprises at least one of a transverse axis and a longitudinal axis; and
    adjusting an angle of the head image according to the axis of the head image, to enable at least one of the transverse axis to remain horizontal and the longitudinal axis to remain vertical.

2. The method according to claim 1, wherein the synthesizing the head image with the preset animation material to generate the virtual image of the target object comprises:
    performing face image segmentation on the head image to determine a boundary of the face image comprised in the head image;
    determining a connection point of the animation material and the head image according to the boundary of the face image and the animation material; wherein the connection point is located on the boundary of the face image, or in a preset area near the boundary of the face image; and
    synthesizing the head image with the preset animation material to generate the virtual image of the target object through the connection point.

3. The method according to claim 2, wherein before the synthesizing the head image with the preset animation material, the method further comprises:
    acquiring attribute information of the target object according to the head image; and
    selecting an animation material matching with the attribute information from a preset animation material set according to the attribute information.

4. The method according to claim 3, wherein the synthesizing the head image with the preset animation material comprises:
    adjusting the animation material according to the head image, and synthesizing the head image with the adjusted animation material.

5. The method according to claim 2, wherein before the synthesizing the head image with the preset animation material, the method further comprises:
    acquiring size information of the boundary of the face image; and
    selecting an animation material matching with the size information from a preset animation material set according to the size information.

6. The method according to claim 5, wherein the synthesizing the head image with the preset animation material comprises:
adjusting the animation material according to the head image, and synthesizing the head image with the adjusted animation material.

7. The method according to claim 2, wherein the synthesizing the head image with the preset animation material comprises:
adjusting the animation material according to the head image, and synthesizing the head image with the adjusted animation material.

8. The method according to claim 1, wherein before the synthesizing the head image with the preset animation material, the method further comprises:
acquiring attribute information of the target object according to the head image; and
selecting an animation material matching with the attribute information from a preset animation material set according to the attribute information.

9. The method according to claim 8, wherein the synthesizing the head image with the preset animation material comprises:
adjusting the animation material according to the head image, and synthesizing the head image with the adjusted animation material.

10. The method according to claim 1, wherein the synthesizing the head image with the preset animation material comprises:
adjusting the animation material according to the head image, and synthesizing the head image with the adjusted animation material.

11. The method according to claim 1, wherein in a condition that the real-time scene image comprises the face image of the target object, then acquiring the head image of the target object from the real-time scene image, comprises:
in a condition that the real-time scene image comprises the face image of the target object and satisfies a first preset condition, then acquiring the head image of the target object from the real-time scene image;
wherein the first preset condition comprises at least one of the following:
an area ratio of the face image in the real-time scene image exceeds a preset ratio threshold; or,
the face image is located in a central area of the real-time scene image; or,
a selection instruction for the target object is received from a user.

12. The method according to claim 11, further comprising:
in a condition that a second preset condition is satisfied, then acquiring an image of a target item from the real-time scene image, generating a virtual image of the target item according to the target item, and displaying the virtual image of the target item in the real-time scene image based on the augmented reality display technology;
wherein the second preset condition comprises at least one of the following:
the face image is not comprised in the real-time scene image; or,
the area ratio of the face image in the real-time scene image does not exceed a preset ratio threshold in the real-time scene image; or,
the face image in the real-time scene image is not located in the central area of the real-time scene image; or,
the face image in the real-time scene image is a profile of the target object, and a deflection angle of the profile of the target object exceeds a preset angle threshold; or,
a selection instruction for the target item in the real-time scene image is received from a user.

13. The method according to claim 1, further comprising:
playing the animation material to perform motion control on the virtual image of the target object.

14. The method according to claim 13, wherein the playing the animation material to perform motion control on the virtual image of the target object comprises:
playing the animation material according to a preset animation frame of the animation material to perform motion control on the virtual image of the target object.

15. The method according to claim 1, further comprising:
in response to a control instruction for the virtual image of the target object from a user, controlling the virtual image of the target object accordingly, wherein the control instruction comprises at least one of the following: a rotation control instruction, a scaling-up control instruction, a movement control instruction, and a scaling-down control instruction.

16. The method according to claim 1, wherein the limb or the wearing object of the virtual image performs a specific action.

17. The method according to claim 16, wherein the specific action of the limb comprises a running, a jumping, a waving of hands, or a waving of an object; the specific action of the wearing object comprises a swaying in wind.

18. A display device based on augmented reality, comprising: at least one processor and a memory;
the memory stores a computer-executable instruction; and
the at least one processor executes the computer-executable instruction stored in the memory, to enable the at least one processor to:
acquire a real-time scene image;
in a condition that the real-time scene image comprises a face image of a target object, acquire a head image of the target object from the real-time scene image, wherein the head image of the target object comprises the face image of the target object;
generate a virtual image of the target object according to the head image; and
display the virtual image of the target object in the real-time scene image based on an augmented reality display technology;
wherein the at least one processor is further enabled to:
synthesize the head image with a preset animation material to generate the virtual image of the target object, wherein the preset animation material comprises a limb animation material or a wearing object material;
wherein the generated virtual image of the target object has a limb corresponding to the limb animation material or a wearing object corresponding to the wearing object material;
wherein the at least one processor is further enabled to:
acquire an axis of the head image, wherein the axis comprises at least one of a transverse axis and a longitudinal axis; and
adjust an angle of the head image according to the axis of the head image, to enable at least one of the transverse axis to remain horizontal and the longitudinal axis to remain vertical.

19. A non-transitory computer-readable storage medium, the computer-readable storage medium stores a computer-executable instruction, and when a processor executes the computer-executable instruction, the following steps are implemented:

acquiring a real-time scene image;

in a condition that the real-time scene image comprises a face image of a target object, then acquiring a head image of the target object from the real-time scene image, wherein the head image of the target object comprises the face image of the target object;

generating a virtual image of the target object according to the head image; and displaying the virtual image of the target object in the real-time scene image based on an augmented reality display technology;

wherein the generating the virtual image of the target object according to the head image comprises:

synthesizing the head image with a preset animation material to generate the virtual image of the target object, wherein the preset animation material comprises a limb animation material or a wearing object material;

wherein the generated virtual image of the target object has a limb corresponding to the limb animation material or a wearing object corresponding to the wearing object material;

wherein before the synthesizing the head image with the preset animation material to generate the virtual image of the target object, the method further comprises:

acquiring an axis of the head image, wherein the axis comprises at least one of a transverse axis and a longitudinal axis; and adjusting an angle of the head image according to the axis of the head image, to enable at least one of the transverse axis to remain horizontal and the longitudinal axis to remain vertical.

* * * * *